US010199983B2

(12) United States Patent
Meine et al.

(10) Patent No.: US 10,199,983 B2
(45) Date of Patent: *Feb. 5, 2019

(54) ROOF ATTACHMENT ASSEMBLY FOR SOLAR PANELS AND INSTALLATION METHOD

(71) Applicant: Ironridge, Inc., Hayward, CA (US)

(72) Inventors: Shawn Meine, Phoenix, AZ (US); Jon Ash, Phoenix, AZ (US); William Kim, San Mateo, CA (US); David Taggart, San Carlos, CA (US); William Pereira, Phoenix, AZ (US)

(73) Assignee: Ironridge, Inc., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/685,433

(22) Filed: Aug. 24, 2017

(65) Prior Publication Data

US 2017/0366132 A1    Dec. 21, 2017

Related U.S. Application Data

(63) Continuation of application No. 14/946,569, filed on Nov. 19, 2015, now Pat. No. 9,800,199.

(51) Int. Cl.
*H02S 20/23*     (2014.01)
*F24S 25/63*     (2018.01)
*F24S 25/61*     (2018.01)
*F24S 25/634*    (2018.01)
*F24S 25/00*     (2018.01)

(52) U.S. Cl.
CPC .............. *H02S 20/23* (2014.12); *F24S 25/61* (2018.05); *F24S 25/634* (2018.05); *F24S 2025/021* (2018.05); *Y02B 10/12* (2013.01); *Y02B 10/20* (2013.01); *Y02E 10/47* (2013.01)

(58) Field of Classification Search
CPC ........ H02S 20/23; F24J 2/5245; F24J 2/5256; F24J 2002/5294; Y02E 10/47; Y02E 10/12; Y02E 10/20
See application file for complete search history.

(56) References Cited

U.S. PATENT DOCUMENTS

| | | | |
|---|---|---|---|
| 4,165,853 A | 8/1979 | Brandt | |
| 6,959,517 B2 | 11/2005 | Poddany et al. | |
| 7,592,537 B1 * | 9/2009 | West .................. | H02S 20/00 136/251 |
| 7,758,011 B2 | 7/2010 | Haddock | |
| 8,109,048 B2 | 2/2012 | West et al. | |
| 8,181,402 B2 | 5/2012 | Tsuzuki et al. | |
| 8,181,926 B2 | 5/2012 | Magno et al. | |
| 8,245,460 B2 | 8/2012 | Yamanaka et al. | |
| 8,375,654 B1 | 2/2013 | West et al. | |
| 8,453,986 B2 | 6/2013 | Schnitzer | |
| 8,578,666 B2 | 11/2013 | Yen | |
| 8,595,996 B2 | 12/2013 | Korman et al. | |
| 8,756,881 B2 | 6/2014 | West | |

(Continued)

*Primary Examiner* — Jeanette E Chapman
(74) *Attorney, Agent, or Firm* — Lance C. Venable; Law Office of Lance C. Venable, PLLC (57) ABSTRACT

Disclosed herein is a roof attachment assembly for mounting a solar panel on a roof without the use of rails. The assembly includes a splice member includes grounding elements for electrically grounding the solar panel and is removably connected to the array skirt. Also disclosed is a method of using the assembly and an assembly kit.

3 Claims, 13 Drawing Sheets

(56) References Cited

U.S. PATENT DOCUMENTS

| | | | | |
|---|---|---|---|---|
| 8,820,018 B2* | 9/2014 | Maley | ..................... | E04B 9/006 |
| | | | | 52/220.6 |
| 8,935,893 B2* | 1/2015 | Liu | ..................... | F24J 2/5258 |
| | | | | 126/623 |
| 9,097,443 B2* | 8/2015 | Liu | ..................... | F24J 2/5258 |
| 9,166,524 B2* | 10/2015 | West | ..................... | F24J 2/5205 |
| 9,171,980 B2* | 10/2015 | Chiu | ..................... | H02S 20/22 |
| 9,431,953 B2* | 8/2016 | Stearns | ..................... | H02S 20/23 |
| 9,473,066 B2* | 10/2016 | Stephan | ..................... | H02S 20/23 |
| 9,800,199 B2* | 10/2017 | Meine | ..................... | H02S 20/23 |
| 2008/0250614 A1* | 10/2008 | Zante | ..................... | F16B 5/0657 |
| | | | | 24/542 |
| 2011/0000519 A1 | 1/2011 | West | | |
| 2011/0154750 A1* | 6/2011 | Welter | ..................... | F24S 40/44 |
| | | | | 52/173.3 |
| 2011/0277296 A1 | 11/2011 | Ramos | | |
| 2012/0017526 A1* | 1/2012 | Eide | ..................... | F24S 25/61 |
| | | | | 52/173.3 |
| 2012/0073219 A1* | 3/2012 | Zuritis | ..................... | F24S 25/65 |
| | | | | 52/173.3 |
| 2013/0000689 A1 | 1/2013 | Baylon | | |
| 2013/0232757 A1 | 9/2013 | Ramos | | |
| 2013/0284239 A1* | 10/2013 | Mun | ..................... | H01L 31/02 |
| | | | | 136/251 |
| 2014/0101996 A1* | 4/2014 | Hempenius | ..................... | A01G 31/00 |
| | | | | 47/58.1 R |
| 2014/0175244 A1* | 6/2014 | West | ..................... | F24J 2/5205 |
| | | | | 248/316.7 |
| 2014/0305046 A1 | 10/2014 | Sterns et al. | | |
| 2014/0318604 A1* | 10/2014 | Schrock | ..................... | H01L 31/02008 |
| | | | | 136/251 |
| 2014/0353435 A1* | 12/2014 | Liu | ..................... | F24J 2/5258 |
| | | | | 248/74.1 |
| 2015/0144373 A1* | 5/2015 | Huang | ..................... | H01L 31/05 |
| | | | | 174/78 |
| 2015/0270027 A1* | 9/2015 | Schrock | ..................... | H01B 5/06 |
| | | | | 52/173.3 |
| 2015/0311606 A1* | 10/2015 | Meine | ..................... | F16B 2/12 |
| | | | | 439/100 |
| 2015/0349166 A1* | 12/2015 | Reynolds | ..................... | H02S 40/34 |
| | | | | 136/251 |
| 2016/0006390 A1* | 1/2016 | Cinnamon | ..................... | H02S 20/23 |
| | | | | 248/237 |
| 2016/0072426 A1* | 3/2016 | Babineau, Jr. | ..................... | H02S 20/23 |
| | | | | 52/173.3 |
| 2016/0268959 A1* | 9/2016 | Meine | ..................... | H02S 40/36 |
| 2016/0285177 A1* | 9/2016 | Meine | ..................... | H01R 4/34 |

\* cited by examiner

ROOF ATTACHMENT ASSEMBLY FOR SOLAR PANELS AND INSTALLATION METHOD

FIELD OF THE DISCLOSURE

The present invention relates generally to roof attachment assembly for solar panels and a method of installation of such solar panels on a roof. More particularly, this disclosure relates to components that form a roof attachment assembly, to provide efficient and easy installation of solar panels on a roof using rail-less guides.

BACKGROUND

In the past, it has been recognized that mounting and installing solar panels on a roof without rail guides is advantageous. Installing rail guides, under certain conditions, can be problematic. In fact, under some conditions, installation can be quite lengthy and expensive.

Consequently, a rail-less mounting system for solar panels has been developed in response to this need. Rail less mounting systems provide the ability to mount the solar panels in a flexible manner. In fact, the rail less mounting system allows this flexibility and enables the panels to be located virtually anywhere on the roof. This, in turn, allows installers of the solar panels to provide more flexible solutions to solar panel installations. And in certain difficult installation configurations, this will allow the installation of panels where they might not otherwise have been able to be installed.

In response to this need, US patent application publication 2011/0000519 and U.S. Pat. No. 8,756,881 disclose a rail-less mounting system for solar panels. But each of these disclosures has undesired limitations. For example, the element that connects the solar panel to the roof in publication '519 above, as shown in FIGS. 25, 29, 30 and 31, is affixed to the roof and thereby limits and inhibits the installation of the solar panels.

In order to introduce flexibility into the installation process, publication '519 relies upon a two-piece clamping mechanism. As can be appreciated by those skilled in the art of installation of solar panels, the less parts that are needed to install the foundational elements to support the solar panels, and the more flexible the elements are in terms of movement and location, the easier the installation process becomes.

Additionally, certain past and present systems have not properly accounted for the storage or concealment of wire bundles that are prevalent when installing solar panels. A failure to properly conceal the wire bundles can cause the solar panel array to be aesthetically unpleasant.

What is needed is a simplified apparatus and method for installing solar panel modules on a roof without the necessity of having rail guides. For example, allowing the solar panel to be installed on a fully rotatable clamp and mount is advantageous and has not been disclosed by any prior reference. Additionally, eliminating multi-piece structures such as the clamp in publication '519 represents a significant improvement in the art.

SUMMARY OF THE DISCLOSURE

This disclosure is summarized below only for purposes of introducing embodiments of the disclosure. The ultimate scope of the disclosure is to be limited only to the claims that follow the specification.

This disclosure provides a roof attachment assembly for mounting solar panels on a roof using a rail-less mounting system.

It is an object of the present invention to provide a roof attachment assembly that includes a pivoting mount for connecting to a flashing assembly that in turn is secured to a roof;

It is a further object of the present invention for the pivoting mount to be rotatable 360 degrees with respect to the flashing assembly;

It is a further object of the present invention for the pivoting mount to move in a back-and-forth motion along an opening where the mount is secured to a flashing assembly;

It is a further object of the present invention to provide a clamping member for securing items such as solar panel modules or array skirts to install a solar panel array on a roof;

It is a further object of the present invention for the clamping member to be rotatably coupled to the pivoting mount;

It is a further object of the present invention for the height of the clamping member to be adjustable by rotating the clamping member in a clockwise or counterclockwise direction;

It is a further object of the present invention to provide a secure locking mechanism for coupling the array skirts and solar panel modules to the clamping member;

It is a further object of the present invention to provide a grounding feature in the clamping member;

It is a further object of the present invention to provide a conduit on the clamping member for storing electrical wiring used to install the solar panel array; and It is a further object of the present invention to provide a method for assembling the various elements as described in the description of the invention below.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

DETAILED DESCRIPTION OF THE EXEMPLARY EMBODIMENTS

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the inventions is not limited to the examples that are described below.

Figure 1:
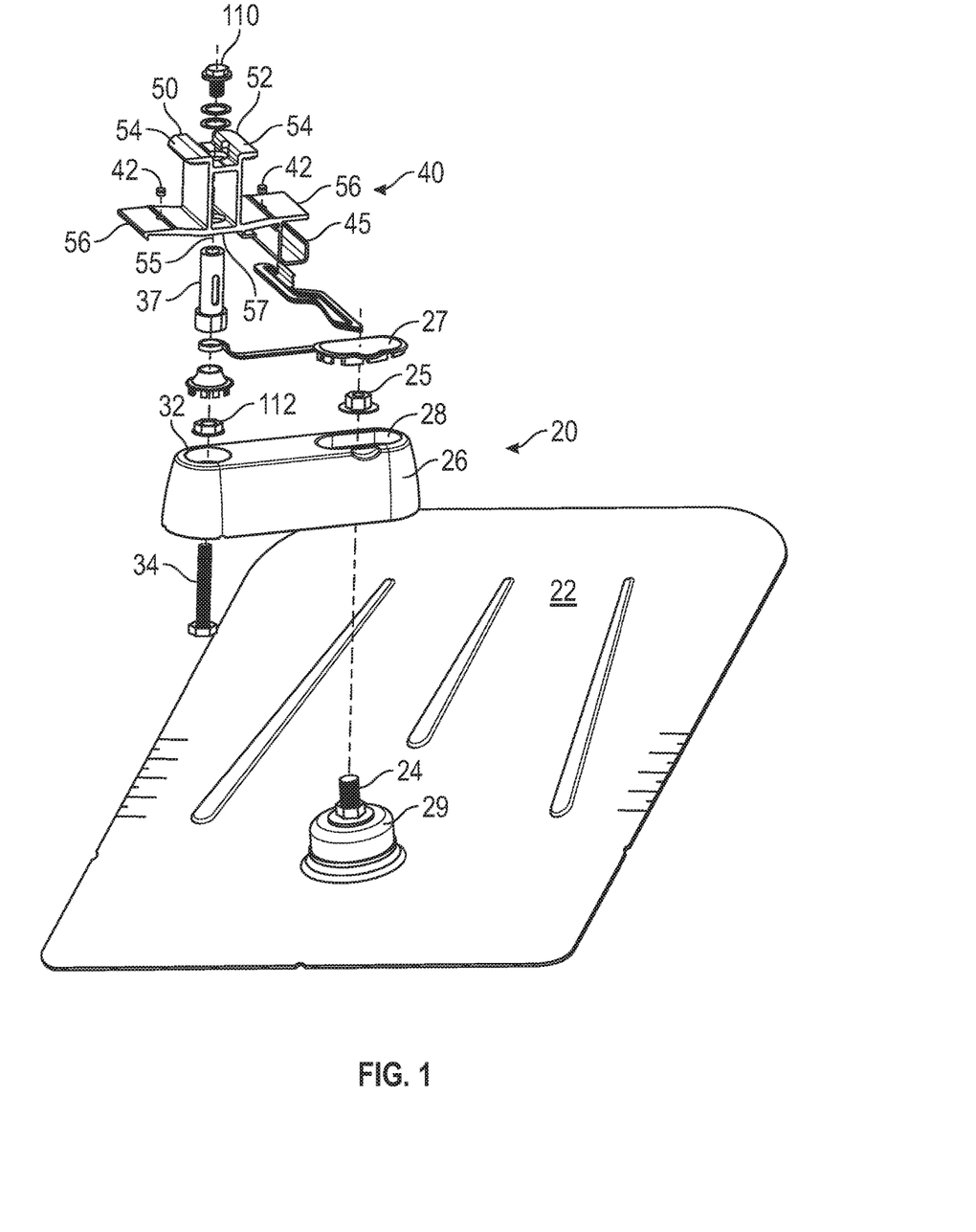
FIG. 1 is an exploded view of a portion of the roof attachment assembly, illustrating a flashing member, a pivot bracket member, and a clamping member.

With particular reference to FIG. 1, a first exemplary embodiment of the roof attachment assembly is shown generally designated by the numeral 20. The roof attachment assembly includes a flashing member 22. The flashing member 22 includes a hanger bolt 24 having self-tapping threads for engagement into the roof (not shown) as is well known in the industry. The flashing member 22 includes a taper lock compression seal 29 around the hanger bolt 24 to prevent leakage. In another exemplary embodiment, the hanger bolt 24 has custom threads which facilitates its connection to various custom devices.

The roof attachment assembly 20 includes a pivot bracket member 26. The pivot bracket member 26 has a first opening 28 adapted for compatible fit with the hanger bolt 24. The opening 28 is generally oval or rectangular in shape. Hardware is provided, which includes the taper lock compression seal 29 to secure the hanger bolt 24 to the pivot bracket member 26, while allowing the pivot bracket member 26 to rotate 360 degrees relative to the flashing member 22. The hanger bolt 24 is secured to the pivot bracket member 26 with a hanger nut 25. When the hanger nut 25 is secured to the hanger bolt 24, it still allows for full 360-degree rotation of the pivot bracket member 26 as well as allowing the pivot bracket member 26 to slide along the first opening 28 in a back and forth motion. A cover 27 fits on top of the opening 28 once the pivot bracket member 26 is secured to the flashing member 22.

Figure 6:
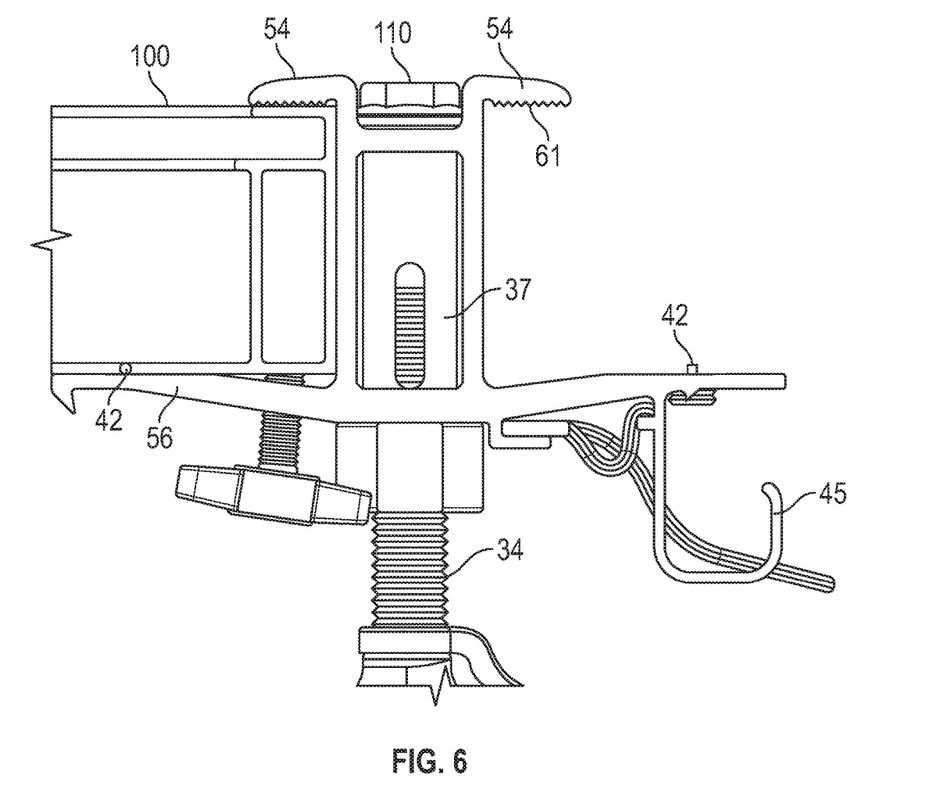
FIG. 6 is a side view of the splice member attached to a solar panel.
Figure 7:
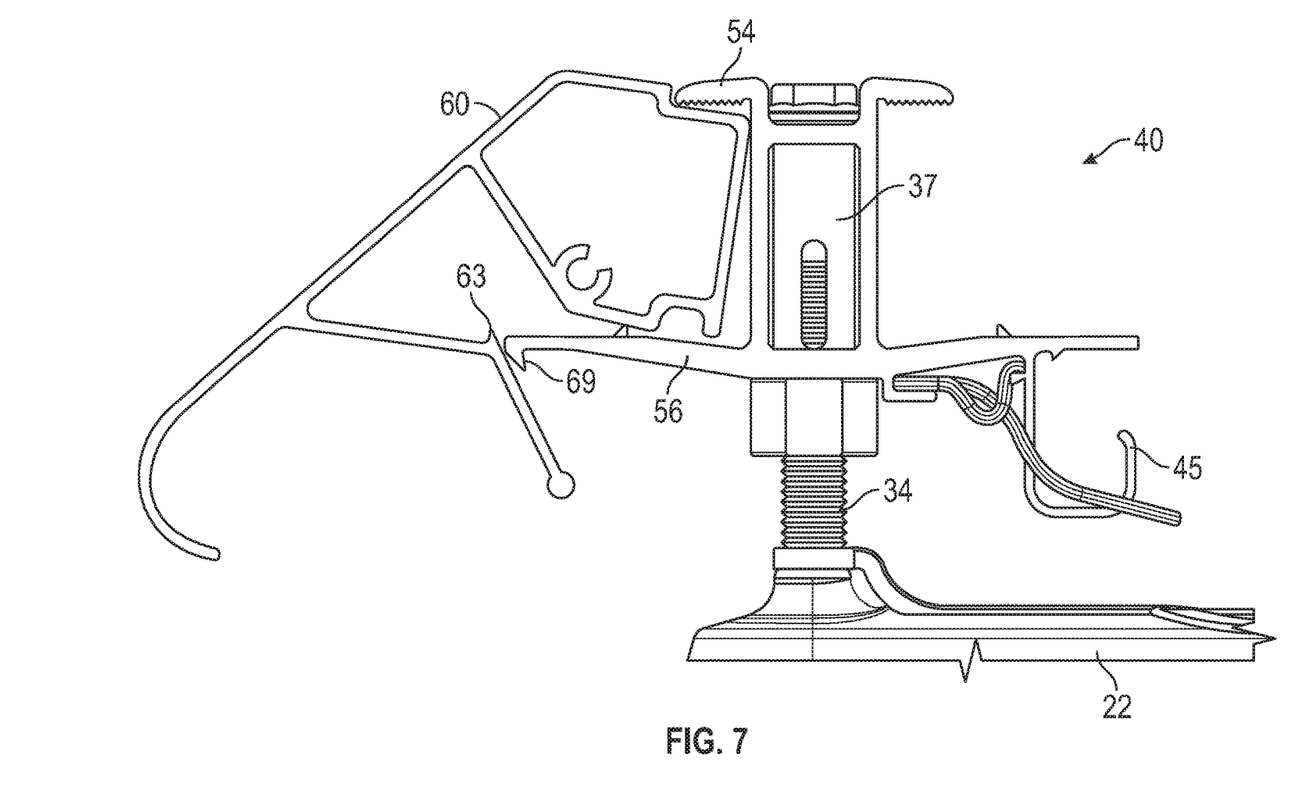
FIG. 7 is a side view of the array skirt being connected to the roof attachment assembly.

The pivot bracket member 26 has a second opening 32. A leveling bolt 34 extends through and is anchored at the second opening 32. Hardware is provided to anchor the leveling bolt 34 at opening 32 and includes a threaded nut 112 that secures the leveling bolt 34 within the second opening 32 of the pivot bracket member 26 as shown. The pivot bracket member 26 includes a level indicator 37, which is more clearly seen in FIGS. 6 and 7, illustrates the ability of the installer to view the level of the solar panel upon installation.

The roof attachment assembly 20 includes a clamping member 40. The clamping member 40 has a first and a second side, 50 and 52, respectively. A base 57 joins the sides 50 and 52 and forms an opening 55 between the sides. Each of the sides 50 and 52 includes a top and a bottom arm, 54 and 56, respectively. The clamping member 40 includes grounding pins 42 on the bottom arm 56. In the embodiment shown in FIG. 1, the arm 56 includes one grounding pin 42. In other exemplary embodiments more than one grounding pin 42 is contemplated and it is further contemplated that the grounding pin 42 appears on the upper arm 54 or on both arms 54 and 56.

The grounding pins 42 are placed where contact is expected by items trapped within the clamping member 40. This assures secure electrical contact and a robust ground.

The clamping member 40 further includes structure for managing wire used in the solar panel installation. The wire can, and often does, appear in bundles or harnesses. The clamping member 40 includes a wire bundle conduit 45. In order to preserve the electrical integrity of the solar panel installation, the wires of this disclosure are properly placed and care is given to preserve the electrical integrity.

Figure 14:
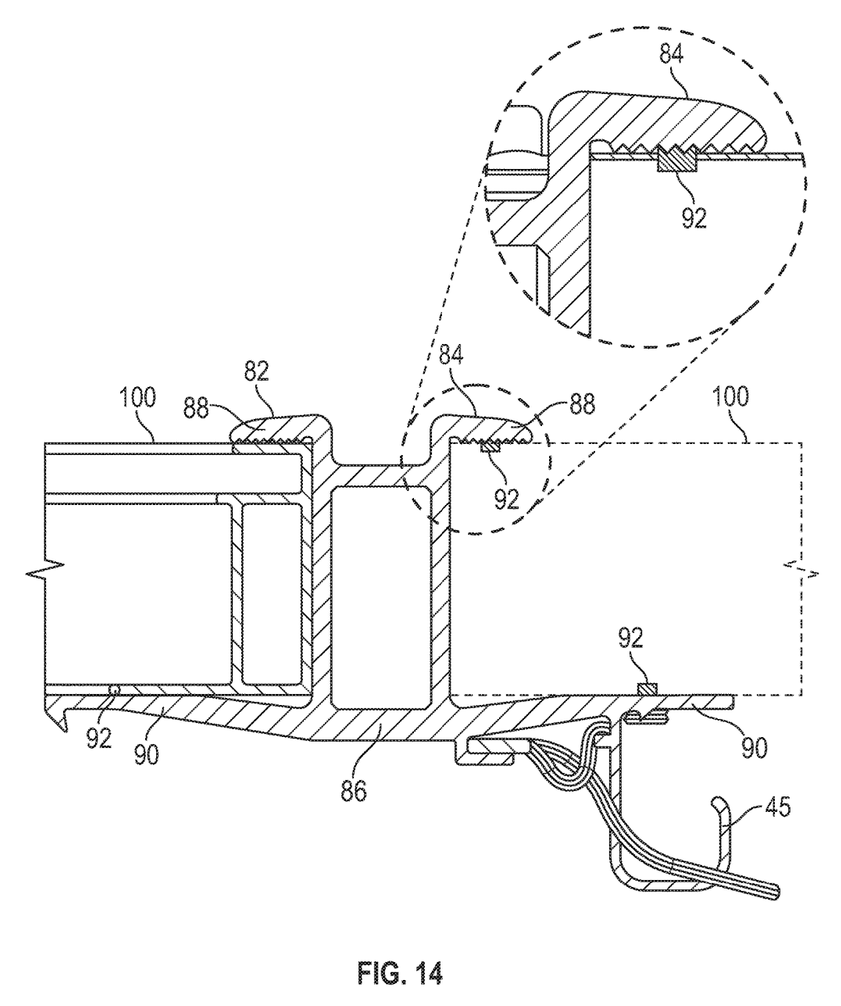
FIG. 14 illustrates a cross-sectional side view of the splice member of FIG. 11 with a close-up view of the grounding pin penetrating the surface of the solar panel module.

In another exemplary embodiment, the clamping member 40 is made from a spring-like material. Each of the arms 54 and 56 are normally urged toward one another. Thus, any item trapped by the arms 54 and 56 is gripped securely between these arms. Ideally, the grounding pins 42 are configured so that when the arms 54 and 56 of the clamping member 40 exert such a force that the grounding pins 42 penetrate the anodized surface of the solar panel module like that shown in FIG. 14 with identical grounding pin 92 as used in the splice member 80. This creates a secure grounding system. This is a similar type of grounding system disclosed earlier in application Ser. No. 13/542,570 and U.S. Pat. No. 9,142,700, which are specifically incorporated herein by reference.

Figure 2:
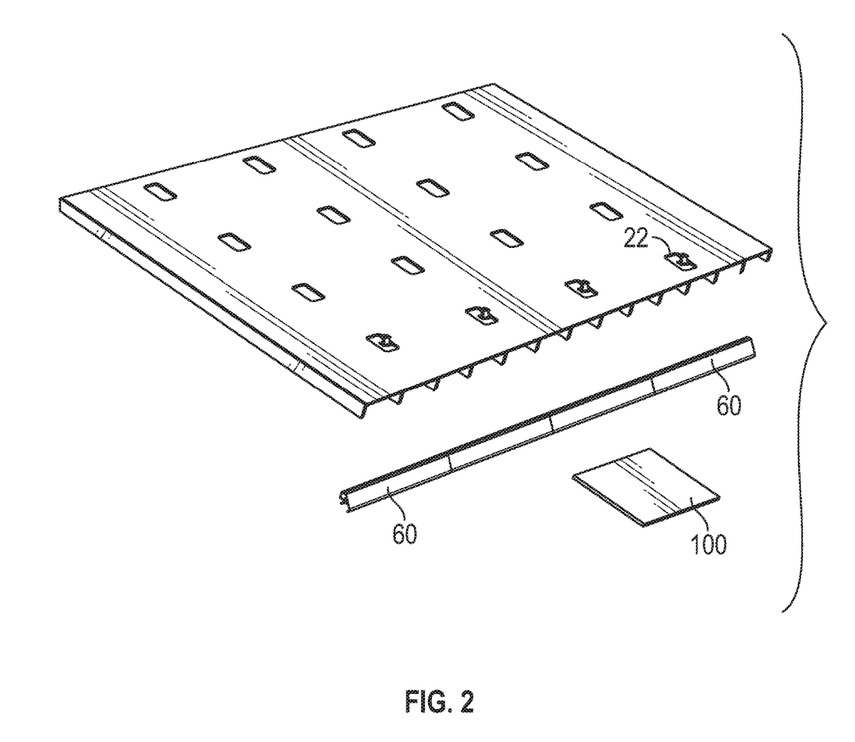
FIG. 2 illustrates, in exploded view, the flashing member being connected to the array skirt and a solar panel.

With particular reference to FIG. 2, there is shown a plurality of array skirts 60 connected to the flashing member 22 on a roof. A solar panel 100 is shown being connected to the adjacent array skirt 60. As shown in FIGS. 4, 7, 8 and 10 the clamping member 40 traps the array skirt 60 within its arms 54 and 56. A splice 80, best shown in FIGS. 5 and 10, secures the end of one solar panel module 100 to the end of the other another solar panel module 100. Between each splice member 80, a clamping member 40 retains and secures the array skirt 60.

Figure 3:
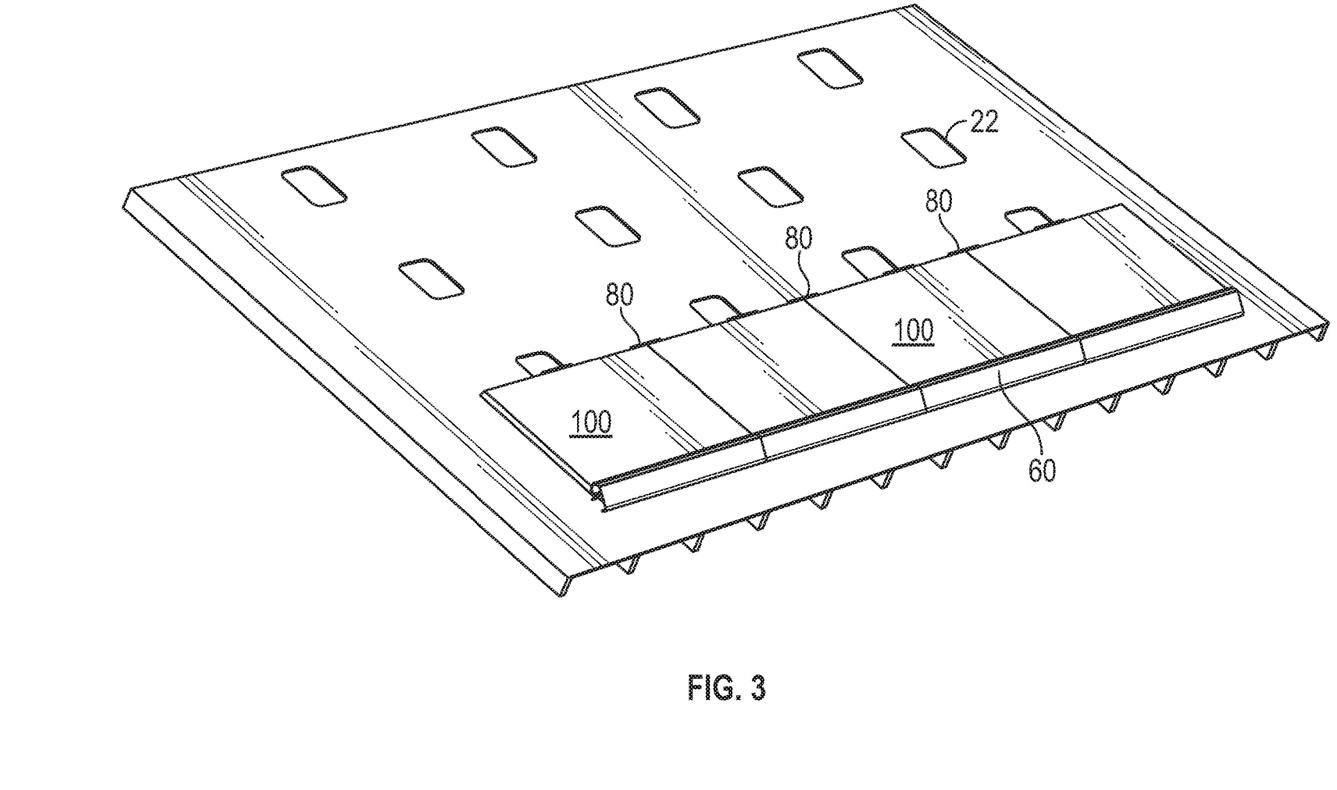
FIG. 3 illustrates, in prospective view, a first row of solar panels attached to a roof using the roof attachment assembly of this disclosure.

With particular reference to FIG. 3, there is shown a plurality of solar modules 100. Each of the solar panel modules 100 is connected to the array skirt 60 and the clamping members 40 and splice member 80 as described above. FIG. 3 shows the first row of solar panel modules 100 connected. As can be seen from FIG. 3, other rows can likewise be connected without the need of additional array skirts 60. It will also be appreciated that no rails or guide rails are necessary for this installation when using the roof attachment assembly 20 and the splice 80.

Figure 4:
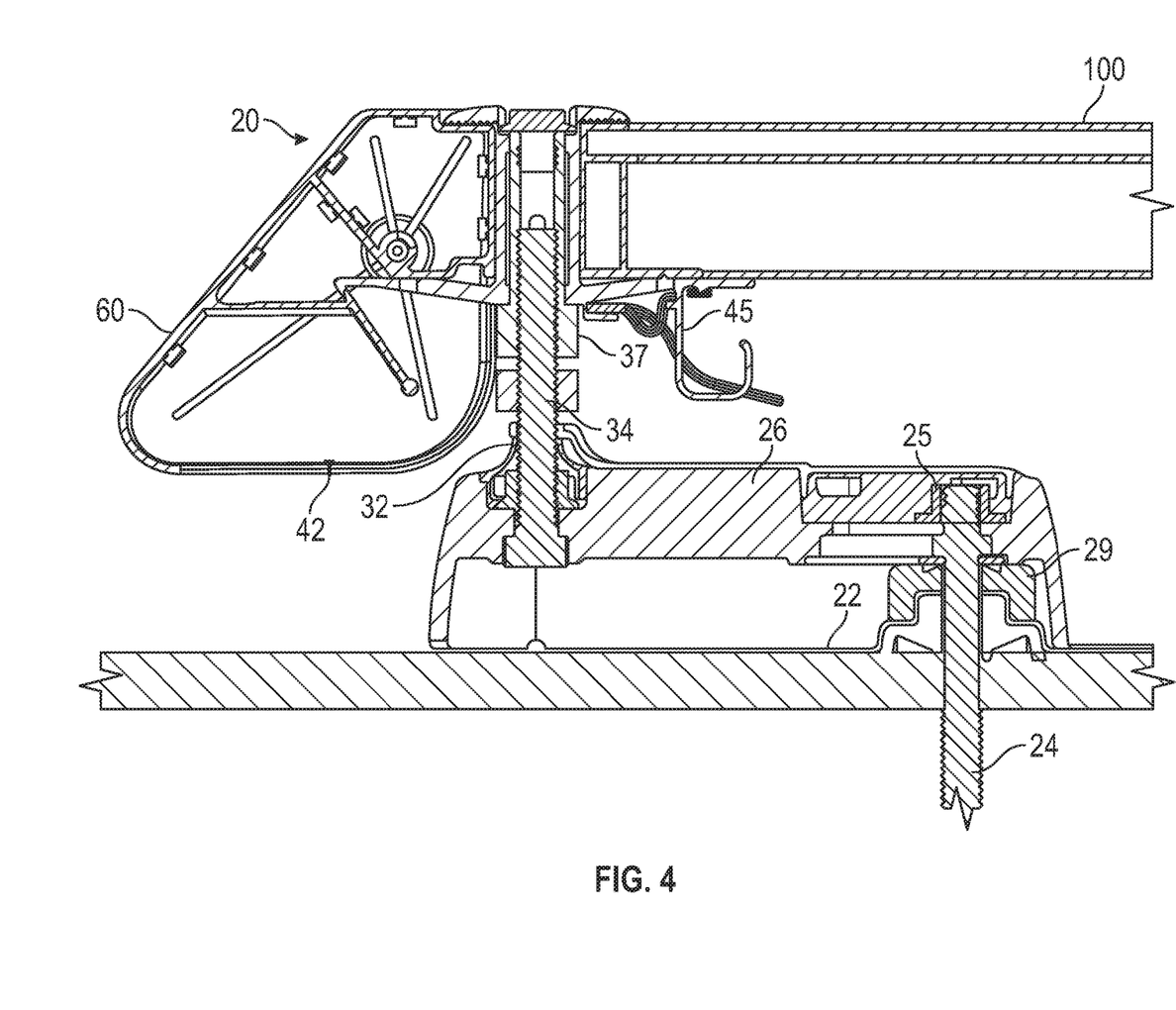
FIG. 4 is a cross-sectional view of one exemplary embodiment of the roof attachment assembly in accordance with this disclosure.

With particular reference to FIG. 4, there is shown, in cross-section, the roof attachment assembly 20 connected to a roof using the flashing member 22. The pivot bracket member 26 is shown connected to the roof through the flashing member 22 using the hanger bolt 24. The taper lock compression seal 29 prevents moisture from leaking onto the roof through the pivot bracket member 26.

Also as shown, the leveling bolt 34 is threaded through the second opening 32 of the pivot bracket member 26. As noted above, the clamping member 40 rotates 360° relative to the roof along the leveling bolt 34. Therefore, the height of the array skirt 60 and the solar panel 100 can be easily adjusted to the desired height for the particular application by rotating the clamping member 40. The level indicator 37 allows the installer to view the amount of adjustment made.

Figure 8:
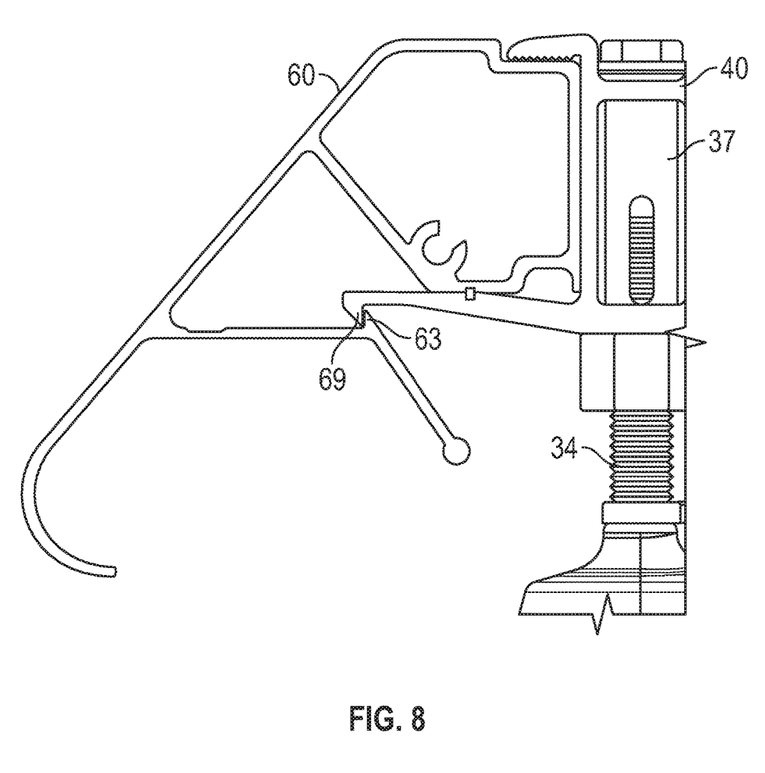
FIG. 8 illustrates the array skirt falling mounted to the roof attachment assembly.

Also as illustrated in FIG. 4, the array skirt 60 and the solar panel module 100 are fully connected to the roof attachment assembly 20. With particular reference to FIGS. 7 and 8, the method of installation of the array skirt 60 with the roof attachment assembly 20 is illustrated.

Figure 5:
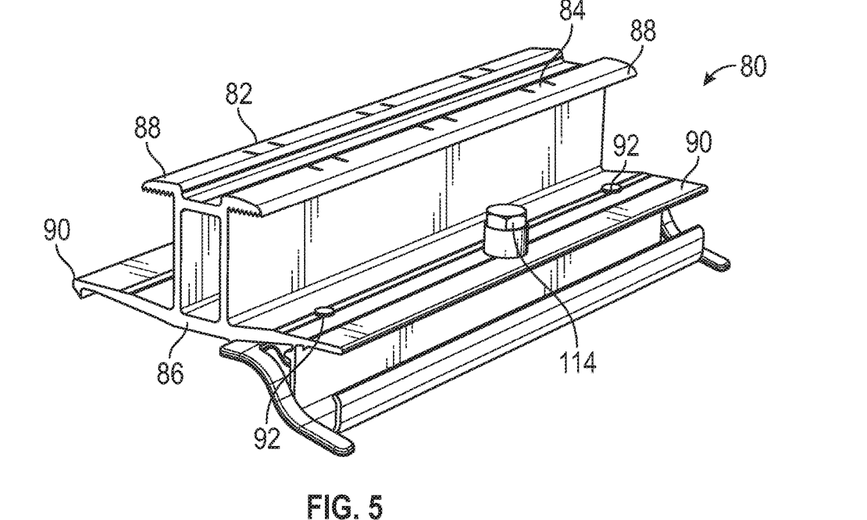
FIG. 5 is a prospective you of the splice member in accordance with this disclosure.
Figure 10:
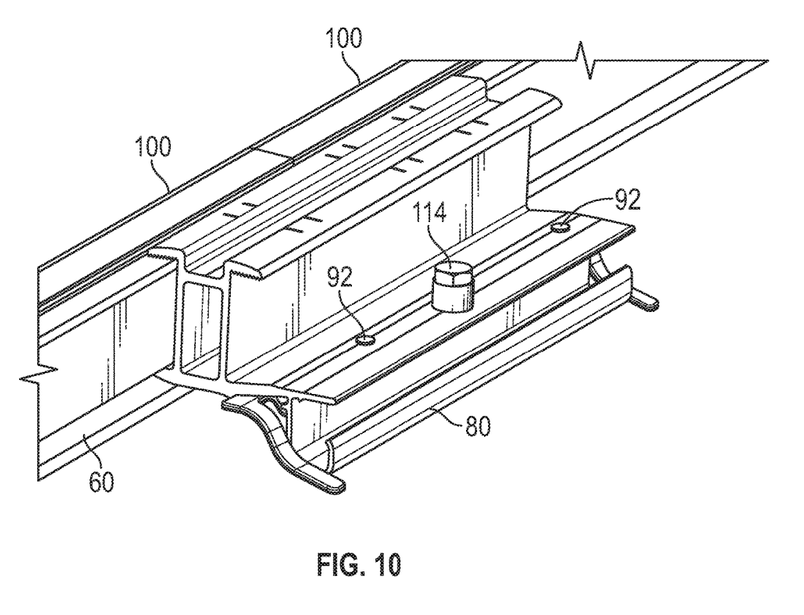
FIG. 10 illustrates, in prospective view the splice member connecting two array skirts attached thereto.
Figure 11:
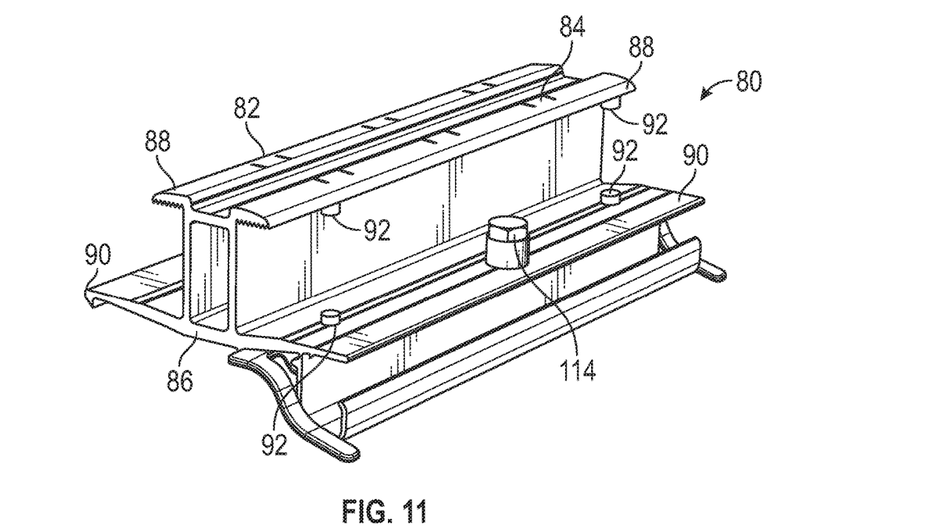
FIG. 11 illustrates, in prospective view the splice member of FIG. 10 connecting two array skirts attached thereto with grounding pins on the top and bottom arms of the splice member.
Figure 12:
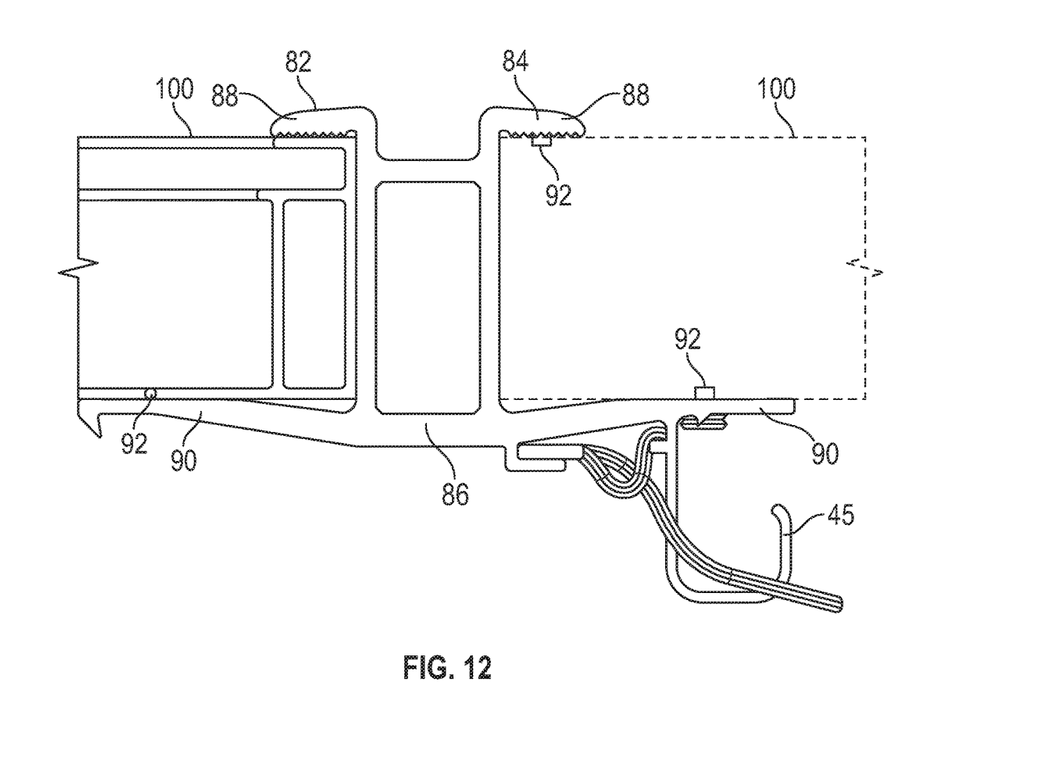
FIG. 12 illustrates a side view of the splice member of FIG. 11 with a transparent view of solar panels installed in the splice member.

With particular reference to FIG. 5, there is shown the splice member 80. The splice member 80 is typically installed between two array skirts 60 and two solar panels 100 as shown in FIG. 10. The splice member 80 attaches each of the array skirts 60 and solar panels 100 to one another as best shown in FIGS. 3 and 10. Unlike the clamping member 40, the splice member 80 is a standalone member that connects the solar panels 100 or array skirt members while being detached from the flashing 22 or the roof attachment assembly 20. The splice member 80 has a construction similar to the clamping member 40. The splice member 80 has a first side 82 and a second side 84. A bridge 86 connects the sides 82 and 84. Each of the sides 82 and 84 include a pair of arms 88 and 90 that are permanently connected to the sides 82 and 84 and form a stationary non-adjustable opening for receiving an item. In an exemplary embodiment, the splice member 80 is made from a spring like material with the arms 88 and 90, being normally urged toward one another. Thus, any item that is trapped within the arms is secured by the spring like material. As defined herein, the term "item" means either a solar panel 100 or an array skirt 60.

Figure 13:
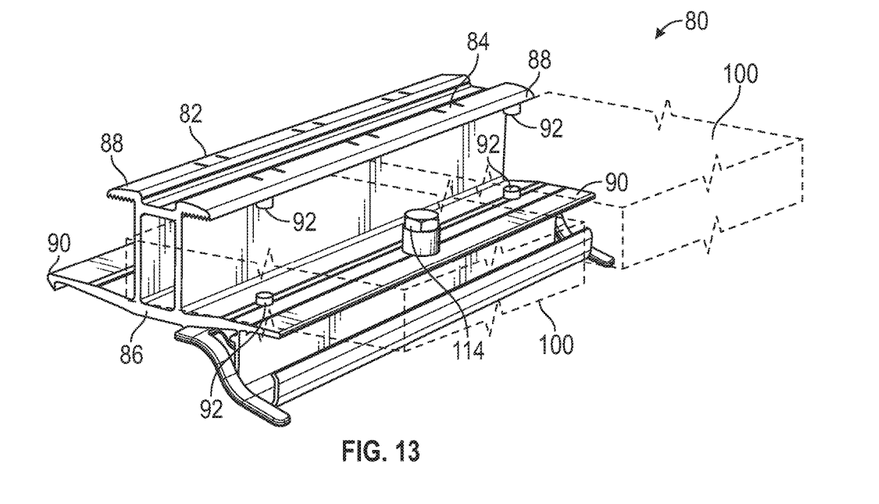
FIG. 13 illustrates a perspective of the splice member of FIG. 12.
Figure 15:
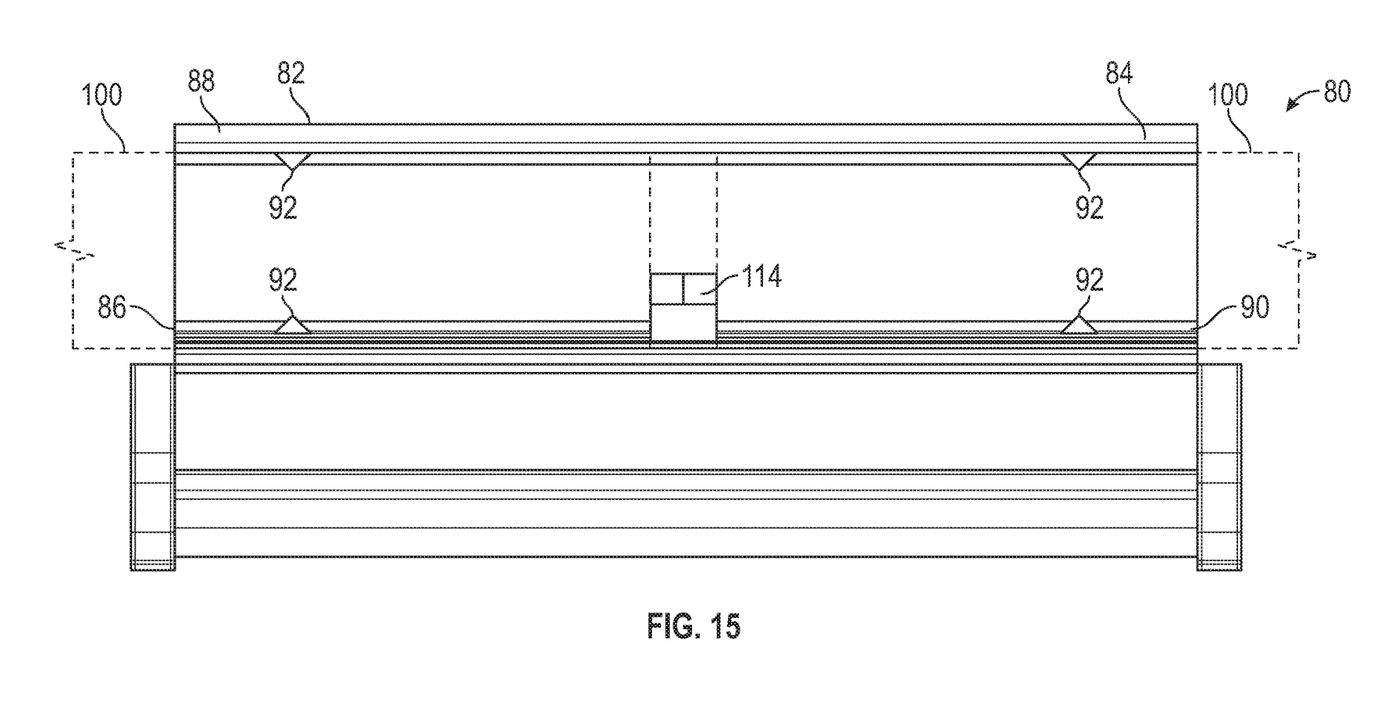
FIG. 15 illustrates a front view of the splice member of FIG. 12.

As illustrated, the splice member 80 includes a grounding pin 92. In the embodiment illustrated, the grounding pin 92 is located on the bottom arm 90. In other exemplary embodiments, like those shown in FIGS. 11-15, the grounding pin 92 is located on the upper arm 88. In other exemplary embodiments, the grounding pin 92 is located on one arm 90 of the splice member 80. Within the spirit and scope of the invention, it is contemplated that multiple grounding pins 92 are used in various locations where electrical grounding contact is desired like those shown in FIGS. 11-15. The splice member 80 also includes a separator 114—also referred to as a spacer. The separator 114 serves to keep the solar panels apart so that they function properly. Separator 114 insures separation between each successive solar panel 100 installed on the splice member 40 as shown in FIGS. 13 and 15. The separator 114 can be present on either bottom arm 90 of the first or second side.

FIG. 6 illustrates another exemplary embodiment of the clamping member 40. In this embodiment, the clamping member 40 includes grounding pins 42 as shown. The clamping member 40 further includes a level indicator 37. Additionally, the upper arm 54 of the clamping member 40 is provided with a gripping member 61 which serves to enhance the gripping function of the clamping member 40. As shown in FIG. 6, the clamping member 40 includes a wire bundle conduit 45.

With particular reference to FIGS. 7 and 8, there is shown the operation of installing the array skirt 60 into the clamping member 40. Initially, the array skirt 60 is rotated and slid into the arms of the clamping member 40. As the rotation continues, the array skirt 60 is snapped in place. As shown in the exemplary embodiment of FIGS. 7 and 8, the clamping member 40 includes a reverse notch 69 for securing the array skirt 60 into place. It will also be appreciated that array skirt 60 includes a compatible notch 63. Together, these compatible mating notches 69 and 63 worked together to create a secure snap lock for the array skirt 60 to the clamping member 40.

Figure 9:
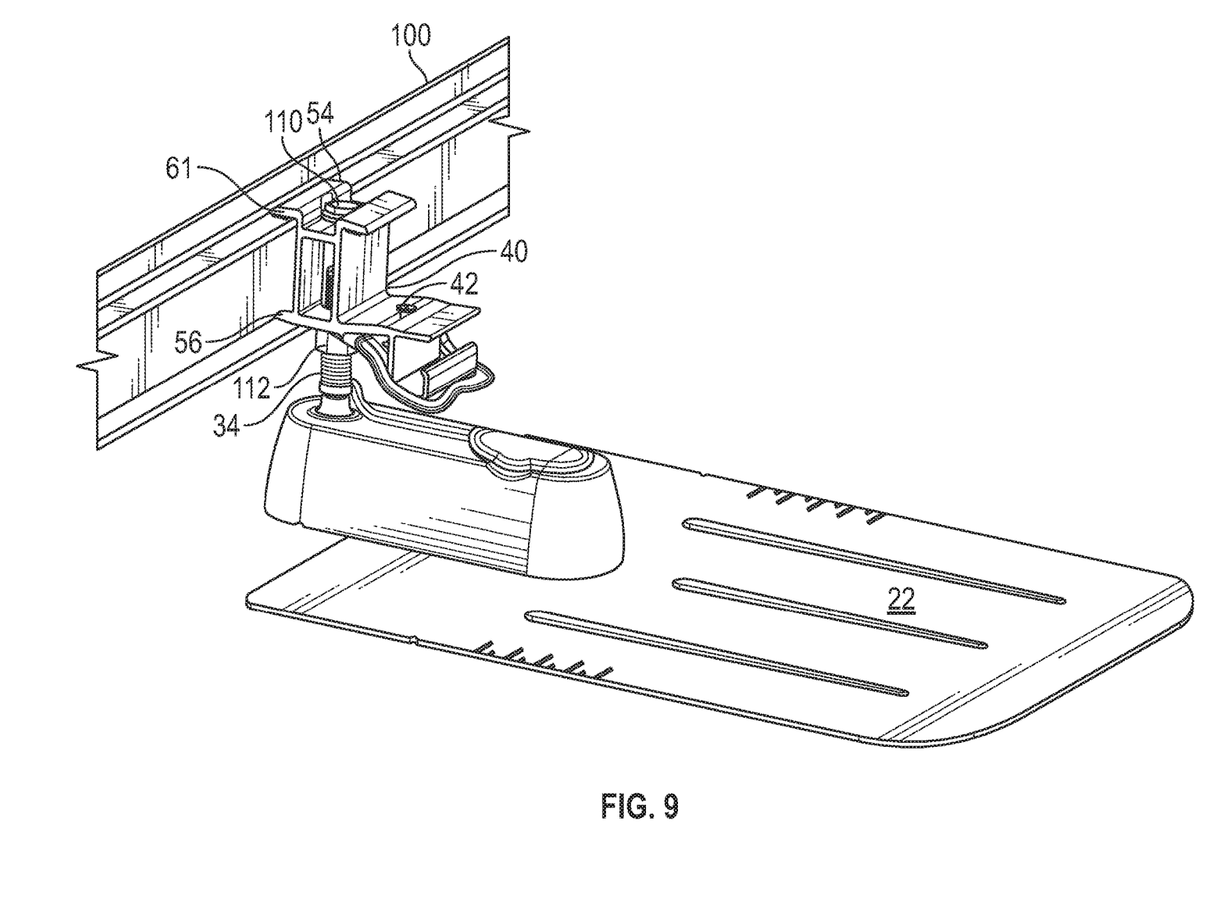
FIG. 9 illustrates, in prospective view, a solar panel connected to the clamping member of the roof attachment assembly.

With particular reference to FIG. 9, there is shown a perspective view of the assembled clamping member 40 connected to solar panel 100. As seen, the gripping member 61 along with the action of the arms 54 and 56 grips the solar panels 100 securely in place. The grounding pin 42 cuts through the exterior surface of the solar panel and creates the grounding contact desired.

In order to rotate and make fine adjustments to the correct height of the solar panel 100, a socket drive 110 it is provided. Also, see FIG. 1. The socket drive 110 is rotated to allow vertical movement of the solar panel 100 upon rotation.

With particular reference to FIG. 10, the splice member 80 is shown connecting a first and a second solar panel 100 on one side of the splice member 80 using the method described herein. On the other side of the splice member 80, the splice member 80 is shown ready for installation of a pair of solar panels 100. As shown, a separator 114 is provided in accordance with the objects described above.

The Method of Installation

An exemplary embodiment of the method of installation using the roof attachment assembly 20 described herein is described below. Initially, the flashing member 22 is mounted on the roof using the hanger bolt 24. Once the flashing member 22 is secured to the roof, the pivot bracket member 26 is secured to the flashing member 22 using hanger bolt 24 and the hanger nut 26. The leveling bolt 34 is then threaded through second opening of pivot bracket member 26 and secured thereto. The clamping member 50 is rotatably attached to the leveling bolt 34. As described earlier the leveling bolt 34 is used to adjust the height of the clamping member. The height adjustment is seen in the level indicator 37. This allows accurate adjustment of the height of the solar panel module 100.

What is claimed is:

1. An assembly for coupling solar panels collinearly in a rail-less mounting system comprising:
   a. a detached solar panel splice member comprising;
      i. a first and a second adjacent side the respective first and second sides further comprising a top and a bottom arm each extending outward from the respective first and second sides forming a non-adjustable opening on each of the first and second sides;
      ii. a first grounding pin, configured to penetrate an anodization layer of a first solar panel, the first grounding pin coupled to the bottom arm of the first side;
      iii. a second grounding pin, configured to penetrate an anodization layer of a second solar panel, the second grounding pin coupled to the bottom arm of the first side; and
      iv. a reverse notch that extends beneath the end of the bottom arm that is positioned on the side that is opposite side of the cable storage conduit.

2. An assembly for coupling solar panels collinearly in a rail-less mounting system comprising:
   a. a detached solar panel splice member comprising;
      i. a first and a second adjacent side the respective first and second sides further comprising a top and a bottom arm each extending outward from the respective first and second sides forming a non-adjustable opening on each of the first and second sides;

ii. a first grounding pin, configured to penetrate an anodization layer of a first solar panel, the first grounding pin coupled to the top arm of the first side;

iii. a second grounding pin, configured to penetrate an anodization layer of a second solar panel, the second grounding pin coupled to the top arm of the first side; and iv. a reverse notch that extends beneath the end of the bottom arm of the first or second side that is opposite the side of the cable storage conduit.

3. An assembly for coupling solar panels collinearly in a rail-less mounting system comprising:

a. a detached solar panel splice member comprising;

i. a first and a second adjacent side the respective first and second sides further comprising a top and a bottom arm each extending outward from the respective first and second sides forming a non-adjustable opening on each of the first and second sides;

ii. a first grounding pin, configured to penetrate an anodization layer of a first solar panel, the first grounding pin coupled to the top arm of the first side;

iii. a second grounding pin, configured to penetrate an anodization layer of a second solar panel, the second grounding pin coupled to the bottom arm of the first side; and iv. a reverse notch that extends beneath the end of the bottom arm of the first or second side that is opposite the side of the cable storage conduit.

* * * * *